Aug. 8, 1933.  C. Z. CASE  1,921,559
FILM SPOOL FOR ROLL HOLDING CAMERAS
Filed Dec. 11, 1931
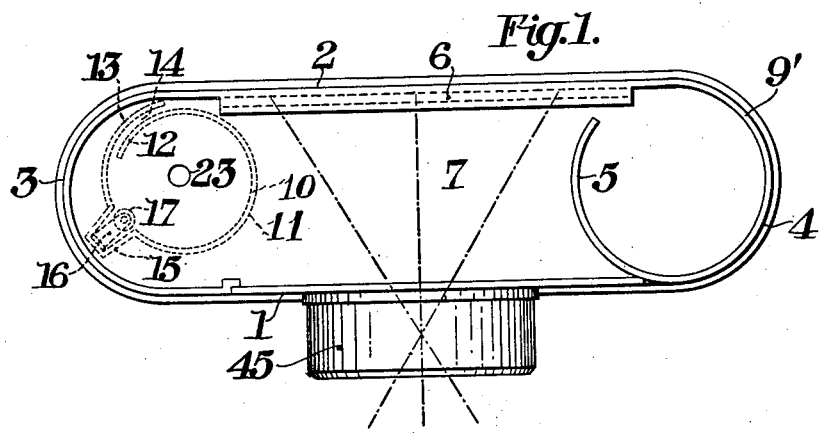
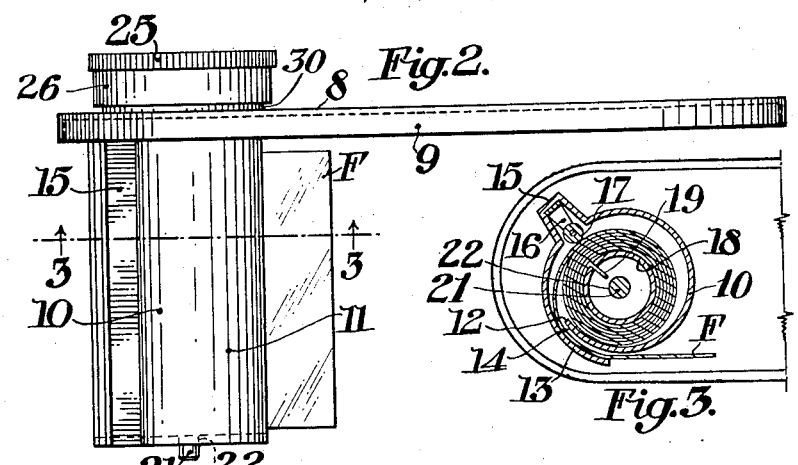
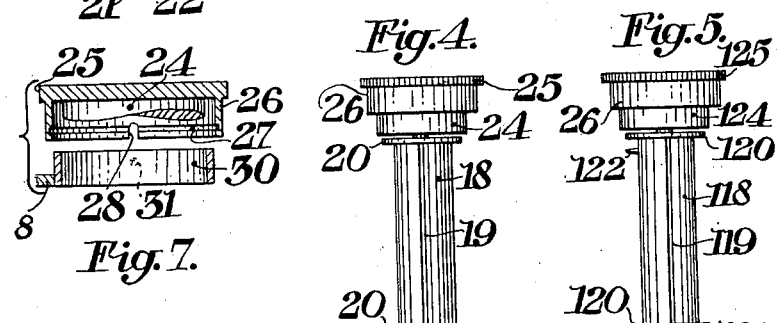
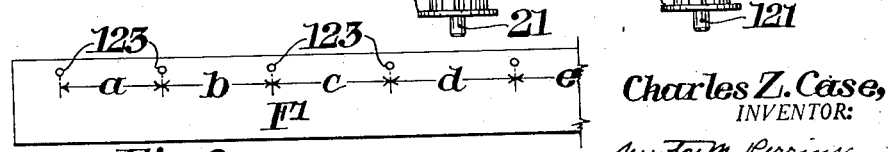
Charles Z. Case,
INVENTOR:
BY
ATTORNEYS.

Patented Aug. 8, 1933

1,921,559

UNITED STATES PATENT OFFICE 1,921,559

FILM SPOOL FOR ROLL-HOLDING CAMERAS

Charles Z. Case, London, England, assignor to Eastman Kodak Company, Rochester, N. Y., a Corporation of New York Application December 11, 1931, Serial No. 580,473, and in Great Britain February 7, 1931

9 Claims. (Cl. 95—31)

This invention relates to photography and more particularly to roll film apparatus designed primarily for small size photographic cameras.

One object of my invention is to provide a photographic film assembly for use in cameras by which film may be pushed through a camera past an exposure aperture. Another object of my invention is to provide a roll film camera in which the roll of film may be loaded into the camera through an aperture at one end of the camera. Another object of my invention is to provide a roll film camera in which the film moving means is attached to the single film spool which is introduced into the camera so that the film may be moved to and from an exposure position by means of the film moving means. Another object of my invention is to provide a roll holding camera with a suitable guideway and film chamber into which film may be propelled from the film package which may be loaded into one spool chamber and other objects will appear from the following specification, the novel features being particularly pointed out in the claims at the end thereof.

In the drawing, wherein like reference characters denote like parts throughout:

Fig. 1 is a top plan view of a camera with the top removed, especially constructed to take film spools designed in accordance with and embodying one form of my invention.

Fig. 2 is a side elevation of the camera top and spool holder removed from the camera.

Fig. 3 is a fragmentary detail figure on line 3—3 of Fig. 2.

Fig. 4 is an enlarged side elevation of a film spool constructed in accordance with one embodiment of my invention.

Fig. 5 is a view similar to Fig. 4, but constructed in accordance with the second embodiment of my invention.

Fig. 6 is a plan view of a length of film which may be used with the film holder shown in Fig. 5.

Fig. 7 is a detail, partially in section, showing a means for retaining the spool holder in position in the camera.

Referring to Fig. 1, the present invention contemplates providing a camera which may consist of a front wall 1, a rear wall 2, and curved end walls 3 and 4. Wall 4 is continued around at 5 to form a cylindrical film container.

The front wall may be provided with a tubular support 45 for the usual camera objective and the rear wall 2 is provided at the top and at the bottom with a straight channel section 6 adapted to guide the two edges of film when it is propelled from the film supply. The camera may be equipped with a bottom wall 7 and a top wall 8, best shown in Fig. 2, the top 8 having a downwardly extending flange 9 adapted to engage and form a light tight joint with the upper edge 9' of the camera walls as shown in Fig. 1.

The top wall carries a depending film container designated broadly as 10. This container preferably consists of a housing 11 which is substantially cylindrical and which is provided with walls 12 and 13 spaced apart leaving a light tight film exit 14 between these walls. There is also an offset rectangular spaced portion of the housing 15 which projects to one side of the cylindrical housing and which is provided with a spring support 16 adapted to support a roller 17, which is normally thrust toward a hub member 18 by means of the spring 16.

Thus a film F, coiled on the hub member 18, is prevented from springing away from the hub member by means of the roller 17. As indicated in Fig. 4, a film may be coiled on the film spool which may consist of a hub member 18 of wood, sheet metal, or other desirable material, in which there is preferably arranged a slot 19 between the spaced flanges 20. The end of a film coil may be entered in the slot 19 and the film is then coiled upon the spool. The bottom portion of the spool is provided with a trunnion 21 adapted to fit into an aperture 22 in the bottom of the film container 10. Preferably, there is a similar aperture 23 in the bottom wall 7 of the camera which will also receive this trunnion.

The upper end of the film spool 18 is directly connected to a hub member 24 which has a top 25 which is knurled to facilitate turning the spool.

The film F, wound upon the film spool, may be provided with a short length of backing paper or may be provided with a dyed film end to prevent light from fogging the inner convolutions of film, as is well known in the art. A camera user purchases a spool of film similar to the device shown in Fig. 4, excepting that the film, of course, is wound on the spool with the light protecting layer outermost and with the inner end of the film engaged in the slot 19. This device is pressed into the spool container 10 at the top of the camera (it being unnecessary to remove the top 9 from the camera 1) by inserting the spool in the top of the container 10 and thrusting the handle 25 downwardly until the trunnion 21 becomes seated in the apertures 22 and 23. When the device reaches this position, it may be held in place by means of the pin and slot connection shown in Fig. 7. The top wall 9 of the camera is provided with an upwardly extending flange 30 from which a pin 31 extends a short distance. The knurled cap 25 is provided with a downwardly extending hub 24 which carries the spool 18 and is also provided with a downwardly extending flange 26 around the inside of which there is a groove 27. A notch 28 on one side of this cap permits the cap to be entered over the flange 30 with the pin 31 lying in the notch 28 and, by turning the knob, the pin 31 will engage in the slot 27 and prevent the film spool from being removed from the camera.

With the parts in this assembled position, an operator may move film into position for exposure in two different ways. First, if desired, the knurled top 25 may be turned until all of the film has been unrolled from the spool 19, in which case it passes through the light tight exit 14, through the parallel flanged guideway 6, and into a spool chamber defined by the end wall 4 of the curved wall 5. To make exposures, the film is turned backwardly again upon the spool, one exposure at a time. The second method of use, which is a preferred one, consists of pushing the film into the opposite spool chamber, making exposures on the separate areas of film as it is moved step by step into the opposite film chamber. After all the film is exposed, it may be re-wound upon the original spool.

In both cases, any known type of film measuring device may be employed to indicate when the proper film areas are in position for exposure.

In a second embodiment of my invention, shown in Fig. 5, the knurled handle 125, hub 124, and film spool 118, are just like the embodiment, shown and described, of Fig. 4, except that the spool 118, which is provided with a slot 119, spaced flanges 120, and trunnion 121, is also provided with a single tooth 122, the function of this tooth being to definitely engage each convolution of film F¹ which is wound upon the spool. Consequently, as indicated in Fig. 6, the spool F¹ is provided with a series of apertures 123. The spaces between these apertures must necessarily increase for each time the film is passed about the film hub. Consequently, the distances A, B, C, D, E, etc., between the apertures 123 are of progressively greater separation, the exact separation depending only on the thickness of the film F¹ and the diameter of the spool 118.

Instead of one tooth on spool 118, two or more may be used, in which case an additional number of film apertures must be employed.

Having thus described my invention, what I claim as new and desire to be secured by Letters Patent is:

1. An improved film winding apparatus for roll film including a camera, a film guideway in the camera, a substantially cylindrical film chamber at one end of the guideway, said camera including an opening through the camera near the other end of the film guideway and means separate from the camera for moving film through the guideway and into the film chamber.

2. An improved film winding apparatus for roll film according to claim 1 in which the means separate from the camera for moving the film in the camera is a handle included in a film assembly adapted to cooperate with the camera.

3. An improved film winding apparatus for roll film according to claim 1 in which the means for moving film through the guideway is a handle attached to a core carrying film adapted to be used in the camera.

4. An improved film winding apparatus for roll film including a camera, a substantially cylindrical spool chamber therein, a film guideway leading to the spool chamber, said camera including an opening in the camera permitting insertion of a film coil into the camera in a position to be unwound through the film guideway.

5. An improved film winding apparatus for roll film including a camera as called for in claim 4 in which the sole opening into the camera for introducing film is at one end of the film guideway.

6. An improved film winding apparatus for roll film including a camera as called for in claim 4 in which the opening in the camera wall is designed to receive a coil of film on a core, there being a handle on the core for moving the film through the guideway.

7. An improved film winding apparatus for roll film cameras, a camera including a pair of spool chambers connected by a film passageway, one of said spool chambers being apertured to permit the entrance of a film spooled on a hub and having a handle by which the film may be pushed through the passageway into the other of said spool chambers.

8. An improved film winding apparatus for roll film cameras comprising a camera including a pair of spool chambers connected by a passageway, said camera having an opening adapted to receive a roll of film, a film spool adapted to be introduced into said camera through said opening and comprising a hub, a handle for moving the hub, and spaced flanges on the hub for protecting a film wound thereon, the said handle, one of said spool flanges, and the camera opening forming together a light-tight connection between the said parts whereby a film wound through the camera from the film spool may be protected against light leakage.

9. An improved film winding apparatus for roll film cameras comprising a camera including a pair of spool chambers connected by a passageway and having a flanged opening in a wall thereof for receiving a part of a film spool introduced into a film chamber of the camera, said film spool comprising a hub, a handle for moving the spool carried by said hub, and spaced flanges carried on said hub for protecting film convolutions wound thereon, said handle and one of said flanges being spaced apart and being adapted to engage said flanged opening carried by the camera whereby said interengaging handle, one of said spool flanges, and the flanged opening carried by the camera are adapted to constitute a light-tight connection between the spool and camera whereby light is prevented from leaking between these parts.

CHARLES Z. CASE.